United States Patent

Luvinh et al.

[11] Patent Number: 5,571,867
[45] Date of Patent: Nov. 5, 1996

[54] HYDROCARBON RESINS, PROCESSES FOR THEIR MANUFACTURE AND ADHESIVE COMPOSITIONS CONTAINING SUCH RESINS

[75] Inventors: Quoc Luvinh; Anne V. Macedo, both of Brussels, Belgium; Richard J. F. Rydzkowski, Le Havre, France

[73] Assignee: Exxon Chemical Patents Inc., Wilmington, Del.

[21] Appl. No.: 307,561

[22] PCT Filed: Mar. 17, 1993

[86] PCT No.: PCT/EP93/00632

§ 371 Date: Jan. 9, 1995

§ 102(e) Date: Jan. 9, 1995

[87] PCT Pub. No.: WO93/19097

PCT Pub. Date: Sep. 30, 1993

[30] Foreign Application Priority Data

Mar. 18, 1992 [GB] United Kingdom ............ 9205841

[51] Int. Cl.$^6$ .................................................... C08L 9/00
[52] U.S. Cl. ........................................................... 525/99
[58] Field of Search ............................................ 525/98, 99

[56] References Cited

U.S. PATENT DOCUMENTS

| | | | |
|---|---|---|---|
| 3,784,530 | 1/1974 | Osborn et al. | 260/80.7 |
| 3,846,352 | 11/1974 | Bullard et al. | 260/5 |
| 4,037,016 | 7/1977 | Habeck et al. | 428/347 |
| 4,046,838 | 9/1977 | Feeney | 260/876 B |
| 4,078,132 | 3/1978 | Lepert | 526/76 |
| 4,104,327 | 8/1978 | Inoue et al. | 260/876 B |
| 4,952,639 | 8/1990 | Minonimya et al. | 525/327.9 |

FOREIGN PATENT DOCUMENTS

| | | |
|---|---|---|
| 0023456 | 2/1981 | European Pat. Off. . |
| 0175593 | 9/1985 | European Pat. Off. . |
| 0260001 | 3/1988 | European Pat. Off. . |
| 1069880 | 11/1959 | Germany . |
| 1538057 | 1/1979 | United Kingdom . |
| 91/07472 | 5/1991 | WIPO . |
| WO91/07472 | 5/1991 | WIPO . |
| WO91/13106 | 9/1991 | WIPO . |

*Primary Examiner*—Edward J. Cain
*Attorney, Agent, or Firm*—John E. Schneider; Frank E. Reid; William G. Muller

[57] ABSTRACT

The invention relates to a hydrogenated hydrocarbon resin of a softening point from 75° to 110° C. having an Mw/Mn of less than 2 as determined by GPC, an aromaticity level of from 15 to 25%, and a melt viscosity in mPa.s at a shear rate of 50 sec$^{-1}$ of less than 500 mPa.s, preferably less than 300 mPa.s at 160 ° C.

15 Claims, 6 Drawing Sheets

GRAPHS OF PEEL ON POLYETHYLENE MEASUREMENTS

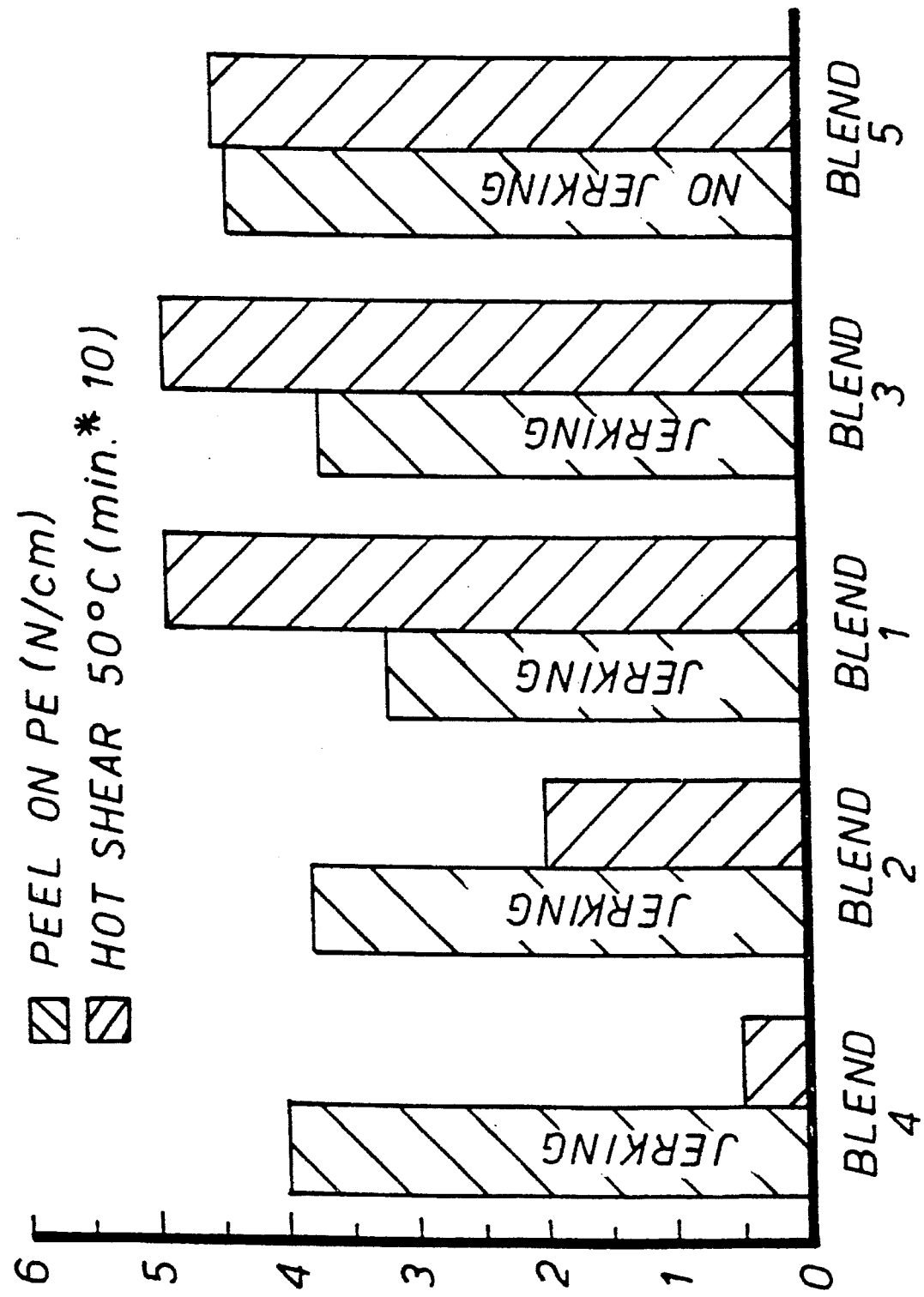

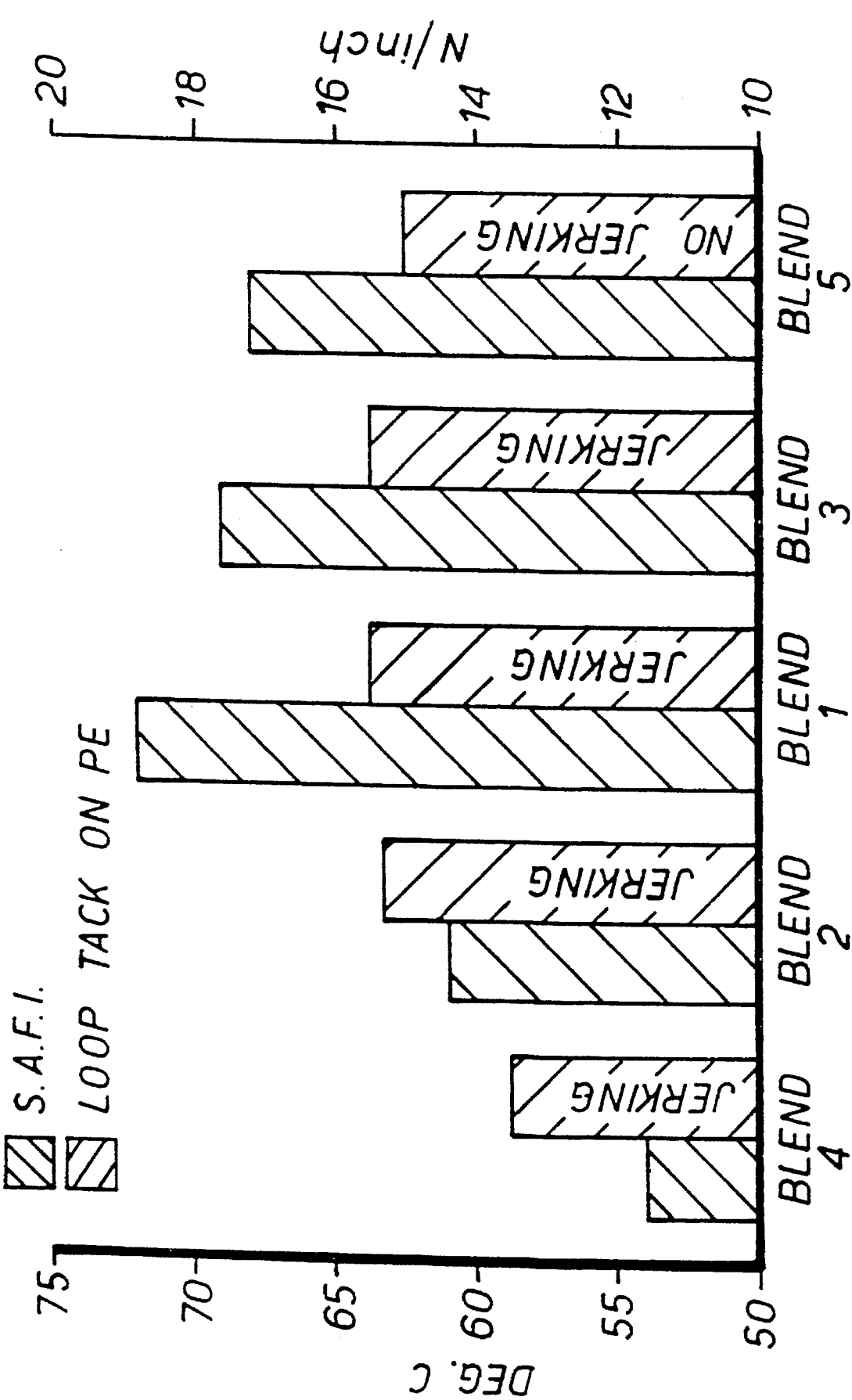

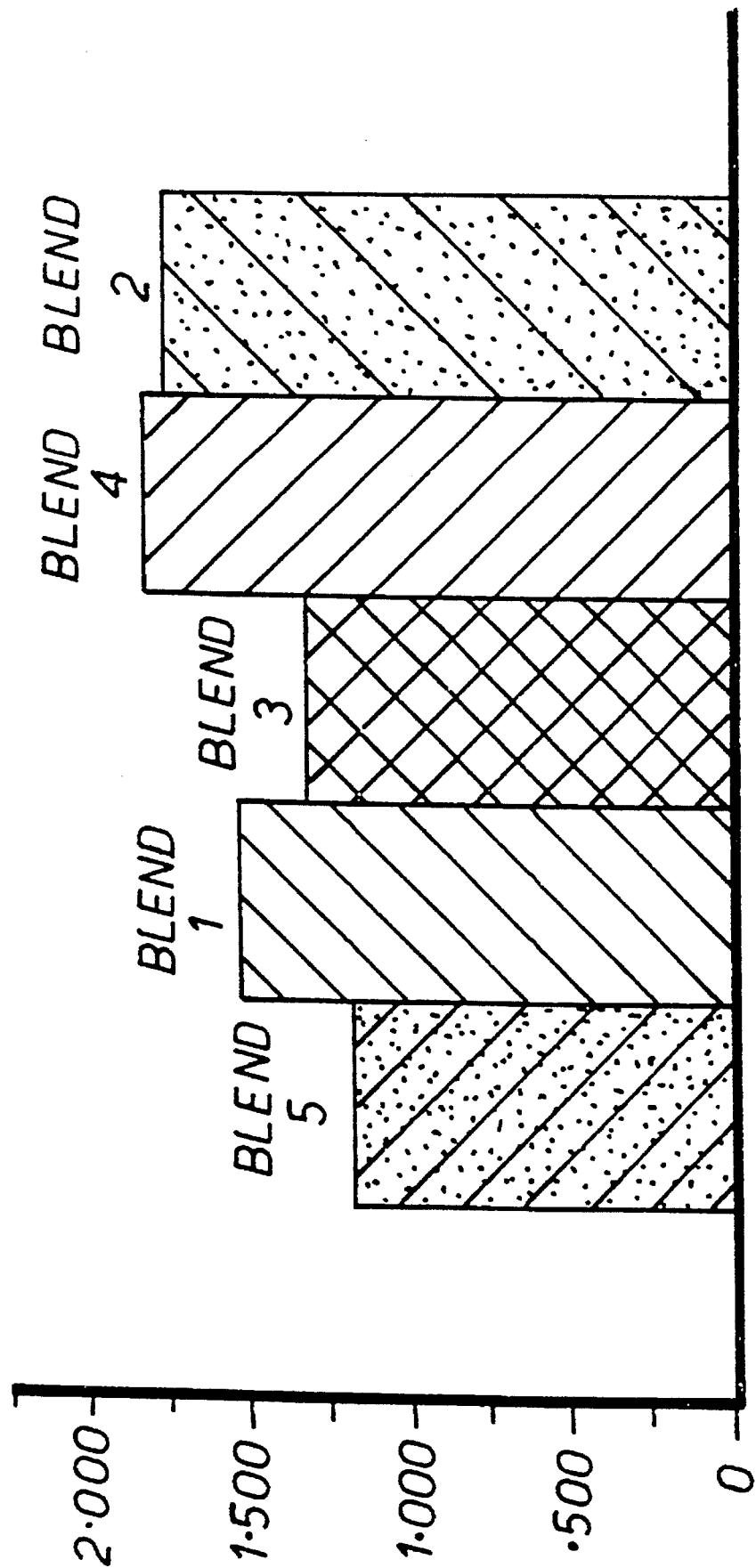

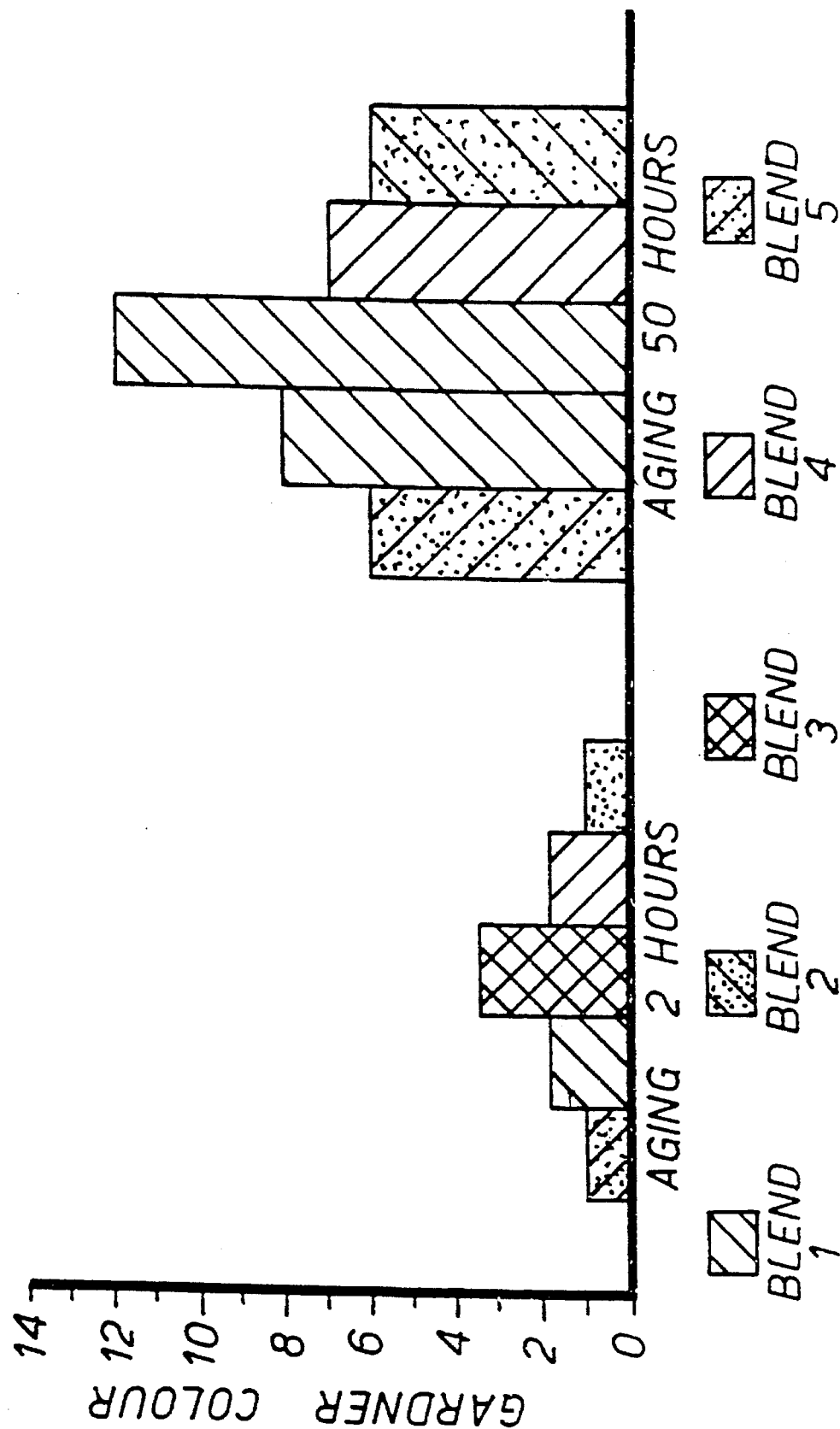

HYDROCARBON RESINS, PROCESSES FOR THEIR MANUFACTURE AND ADHESIVE COMPOSITIONS CONTAINING SUCH RESINS

FIELD OF INVENTION

The invention relates to hydrocarbon resins, processes for their manufacture and to adhesive compositions containing such resins.

In particular, the invention relates to low-colour hydrocarbon resins with good compatibility with styrenic block copolymers, such as SIS and SBS, and to resin/block copolymer blends having good properties as an adhesive composition. These compositions may be used in adhesive label or sanitary (diaper) applications.

BACKGROUND OF INVENTION

Mixed olefinic/aromatic tackifier resins have been prepared from a wide variety of feedstocks including (a) Cut piperylene (piperylene concentrate) of which 1,3-pentadiene is a main component and $C_5$ olefins are a minor component.

(b) Steam cracker olefins: mainly composed of Pentene-2,2-methyl-butenes 1,2 and cyclopentene. Steam cracker olefins is predominantly mono-olefinic.

(c) Heart cut distillate containing vinyltoluenes and indene as main components but also containing styrenics such as styrene and alpha-methylstyrene. Some styrenics have a lowering effect on softening point.

(d) Other aromatics (especially Indenics) tend to increase softening point.

(e) Cyclopentadiene and dicyclopentadiene which have a broadening effect on molecular weight distribution and tend to increase the softening point.

Specific disclosures include:

Tack/fiefs for SBS with relatively low molecular weights prepared by using a Friedel-Crafts catalyst and polymensing a mixture of $C_5/C_6$ (di)olefins and $C_8/C_{10}$ aromatics are disclosed in U.S. Pat. No. 4,078,132 (Lepert) and EP-A-23456 (Evans). The softening points are low in EP-A-23456 (Evans).

In Lepert Example 12 molecular weights and aromaticity are high. However the material does not tackify SBS satisfactorily. Ball tack is 4 to 30 cm and so is too high.

In Evans such high amounts of chain transfer agent (mono-olefins) are used that the softening point is very low. The product will not provide a good adhesive/cohesive performance in SBS blends. The liquid resin serves to substitute the oil in hot melt adhesive (HMA) but cohesive performance is reduced. U.S. Pat. No. 3,784,530 (Goodyear) describes a hydrocarbon resin tackifier having a softening point of from 60° to 110° C. prepared by polymerizing piperylene, 2-methyl-2-butene, dicyclopentadiene and alpha-methyl styrene. The polymerization uses Friedel-Crafts catalyst systems. At least 15% of 2-methyl-2-butene is used in the feed stream which also contains appreciable amounts of piperylene and dicyclopentadiene components and an aromatic component in the form of the alpha-methyl styrene.

The resulting resin is not hydrogenated. It is said to be suitable for track/lying natural and synthetic rubbers including butadiene-styrene copolymers. There is no specific disclosure of block-copolymers. The amounts of 2-methyl-2-butene used are high (above 15 wt %) and this adds to the cost of the resin. At least 15 wt % must also be used of a costly alpha-methylstyrene component to provide the desired aromaticity. The amounts of aromatic component added are minor but the feed components have to be fairly pure (hence the use of alpha-methylstyrene) if a low Gardner colour, rubber-compatible tackifier resin is to be obtained.

U.S. Pat. No. 3,846,352 is a divisional application from U.S. Pat. No. 3,784,530 with almost identical disclosure. U.S. Pat. No. 4,037,016 discloses a resin prepared by Friedel-Crafts polymerisation which is used in an adhesive composition including block copolymers,-with end-blocks forming from 10 to 50 wt % of the copolymer. The tackifying resin has carbon to carbon unsaturation and therefore must be essentially non-hydrogenated. The softening point is low from 60° C. to 80° C.

The feed stream appears to have a similar composition to that described previously but uses higher levels of costly alpha-methyl styrene (over 40 wt %). Other branched chain mono-olefins are described other than 2-methyl-2-butene although 2-methyl-2-butene still seems preferred.

U.S. Pat. No. 4,046,838 describes a block copolymer blend with a resin. The block copolymer may be an SBS. The resin has a softening point of a range of 60 to 110° C. The composition of the resin feed stream appears identical to that of earlier Goodyear documents referred to. The adhesive compositions may be used as a pressure sensitive adhesive.

U.S. Pat. No. 4,104,327 discloses an adhesive composition comprising a block copolymer (including SBS) and a hydrocarbon resin. The hydrocarbon resin contains from 40 to 95% by weight of a $C_5$ 1,3-pentadiene (piperylene) component and from 60 to 5% by weight of an alpha-methyl-styrene unit in the polymer chain.

In the examples 1,3-pentadiene is used exclusively as a diolefin component with much smaller amounts of alpha-methyl-styrene. Table 1 summarizes the examples. No comparison is made with a resin containing $C_5$ diolefin and $C_5$ olefin including branched chain mono-olefins and major amounts of an aromatic component.

Relatively costly pure feedstocks are used. The molecular weight distribution is not given.

EP 175,593 (Exxon) uses a hydrocarbon resin derived from a $C_5C_6$ olefin and diolefin feed as well as from 5 to 30 wt % of para-methyl styrene. The use of para-methyl styrene as opposed to alpha-methyl styrene prevents the decreasing of the softening point. By far the larger amount is olefin and diolefin. The olefinic feed stock is a mixed stream obtained by the cracking and distillation with from 50 to 14.5 wt % of diolefin, from 33.5 to 13 wt % of olefin and from 20 to 35 wt % of aromatics. The stream contains from 4.5 to 15.5% of 1,3-pentadiene. It is suggested that cyclopentadiene levels have to De kept low. It is suggested on page 7 that optionally transfer agents may be used such as branched chain aliphatic olefins as disclosed in GB 1538 057 to narrow the molecular weight distribution. A wide variety of end-uses is suggested. In the examples, no specific transfer agent appears to be used. Aromatic levels in the resulting resin are not described.

U.S. Pat. No. 4,952,639 (Maruzen) discloses a resin and hydrogenation step. Adhesive compositions with ethylene-vinylacetate copolymers are prepared. The precursor resin is prepared using $C_5$ diolefins (D), $C_5$ monoolefins (O) and aromatic monoolefins where the D/O ratio is from 1/1 to 4/1. The resin is hydrogenated extensively. This leads to saturation of at least 80% of the unsaturated bonds of the olefin components and also at least 80% of the aromatic component which is present in an amount of at least 10 wt %.

Branched chain olefins are not specifically added although they may be part of an olefinic or a diolefinic feed stream and may indeed be present in a high concentration (13–23 wt %) See Table 8. Both pure styrenic streams and mixed streams are proposed as aromatic components.

WO 9107472 (Exxon) (PCT/GB/001749) discloses an adhesive formulation for blending with SBS to make an adhesive formulation including from 40 to 90 wt % of $C_5$ olefins and diolefins and from 10 to 50 wt % of a $C_8$–$C_{10}$ aromatic component to give an aromaticity of from 13 to 45 wt % and an Mw/Mn of less than 1.7.

It is therefore an object of the invention to provide a hydrocarbon resin which can be hydrogenated to provide a low-colour styrenic block copolymer compatible resin and a process for making such resin from mixed, low cost feed streams.

It is a further object of this invention to provide an adhesive composition containing a block copolymer, particularly one having high levels of styrene block elements, which provides good adhesion characteristics and which in particular is homogeneous and has a low zippiness, that is to say can be pulled away from a substrate under a constant force without jerking.

SUMMARY OF THE INVENTION

Firstly the invention provides a hydrogenated hydrocarbon resin of a softening point from 75° to 110° C. having an Mw/Mn of less than 2 as determined by GPC, an aromaticity level of from 15 to 25%, and a melt viscosity in mPa.s at a shear rate of 50 $sec^{-1}$ of less than 500 mPa.s, preferably less than 300 mPa.s at 160° C. Preferably the resin has a Mw as determined by GPC of from 500 to 5000, preferably 800 to 3000 and/or a Gardner Color of less than 10, especially less than 8.

Such low viscosities help to improve the rheological behaviour in block copolymer blending to a surprising extent. The provision of a molecular structure yielding such low viscosity is facilitated by the process of the invention to provide the molecular weight, branchiness and chain flexibility desirable.

Secondly the invention provides a process of preparing a low-colour hydrocarbon resin of a softening point of from 75° to 110° C. and an Mw/Mn as determined by GPC of less than 2 which includes the steps of:

(1) preparing a resin from a feed containing a piperylene stream and an olefinic stream to provide a diolefin/olefin ratio (D/O) of from 1/10 to 1/1 and a heart cut distillate stream containing $C_8$ to $C_{10}$ aromatics to provide at least 5 wt % of indenic feed material using Friedel-Crafts catalyst to provide a resin having an aromaticity in the resin of at least 25%, preferably at least 30% in equivalent wt % styrene; and (2) hydrogenating the resin to an extent whereby less than 80% of the aromatic structures are hydrogenated so as to provide an aromaticity of
from 15 to 25%.

The resin preferably has a low molecular weight (number or weight average) and narrow molecular weight distribution by using an appropriate balance between $C_5$ olefins and $C_8$–$C_{10}$ aromatics without the need for adding purified branched chain olefins.

The aromaticity refers to the weight percentage of theoretical styrene content as determined by measuring the number of aromatic protons using proten NMR in the polymerised resin, as explained later herein. This value should not be confused with the % aromatics which is the combined wt % of aromatic components in the feedstreams.

Preferably the feed contains from 5 to 30 wt % preferably from 8 to 20 wt % of the piperylene stream; from 30 to 60 wt % of the olefin stream and from 65 to 10 wt % of the heart cut distillate stream; and optionally no more than 15 wt %, preferably 10 wt % of a separate branched chain olefin stream, said wt % being calculated on the total weight of feedstream excluding an inert solvent. Suitably the hydrogenation is at 180° to 200° C. in continuous or batch form. By appropriate control of the polymerisation process, a melt viscosity can be obtained at a shear rate of 50 $sec^{-1}$ of less than 500 mPa.s, preferably less than 300 in mPa.s at 160° C.

The feedstreams used are readily available and are of low cost. Use of expensive purified aromatic or branched chain olefin chains can be largely or completely avoided.

It is surprising that a combination of such simple, impure feedstreams and selective hydrogenation should yield a high performance tackifier resin for styrenic block copolymers.

The invention thirdly provides an adhesive composition of from 65 to 35 wt % of the above described resin and from 12 to 35 wt % of an SBS or SIS block copolymer, with a balance of oil, if required, and other conventional additives.

The adhesive compositions may include high styrene block copolymers (from 20 to 60 wt %, especially from 25 to 50 wt % of styrene derived units) which have been difficult to tackify previously. It also believed to be beneficial to use block polymer containing no more than 5 wt % of a diblock copolymer.

DETAILED DESCRIPTION OF INVENTION

Figure 1:
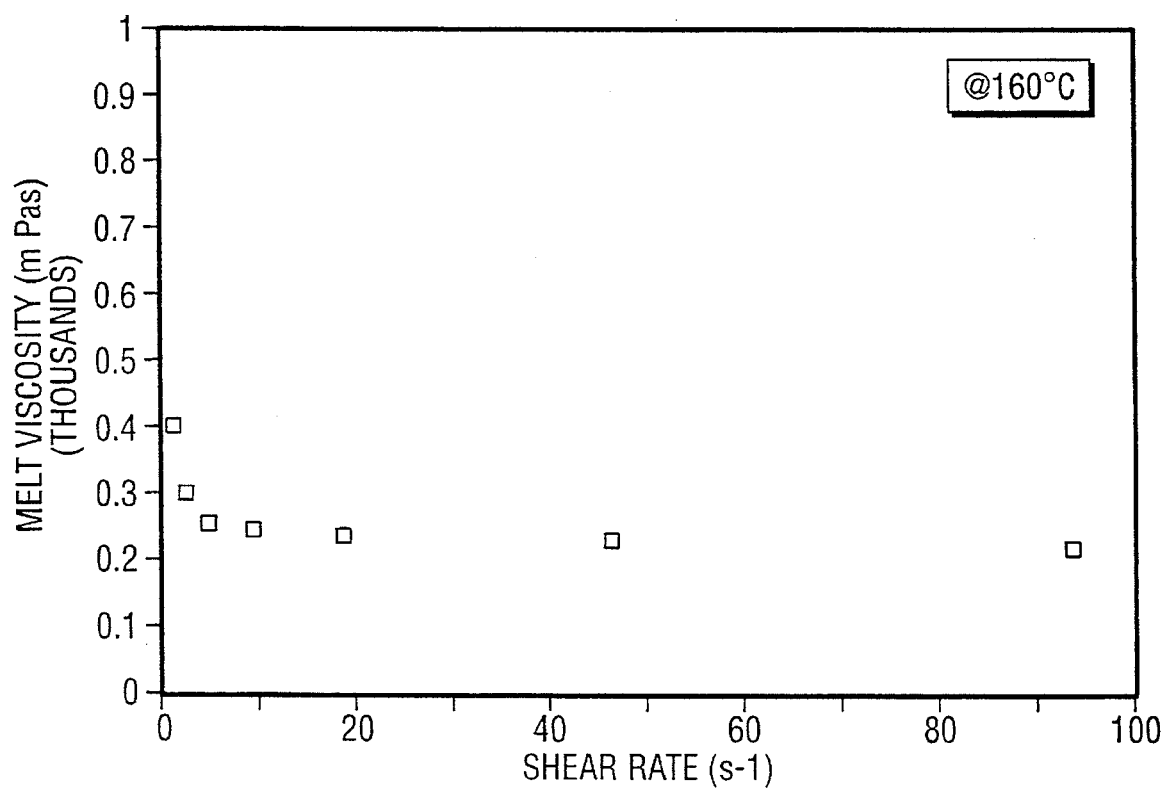
Figure 2A:
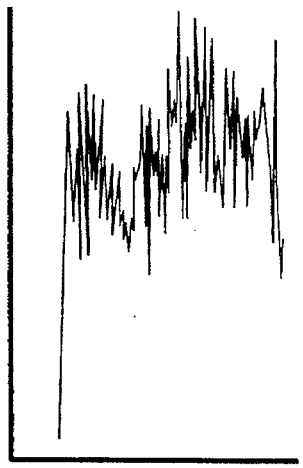
Figure 2B:
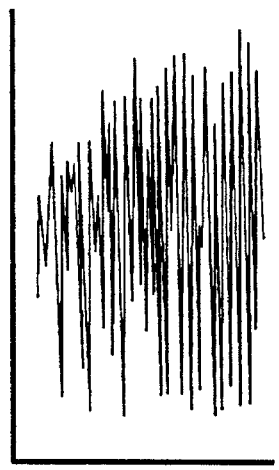
Figure 2C:
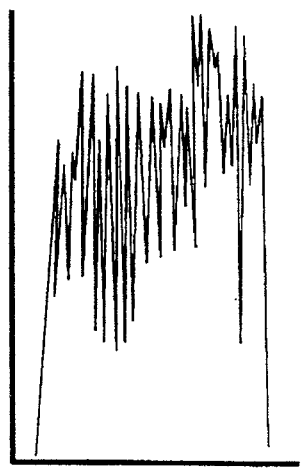
Figure 2D:
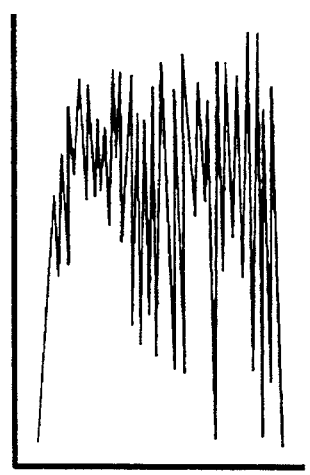
Figure 2E:
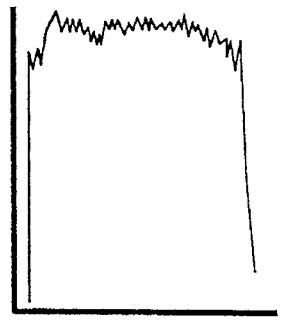
Figure 2F:
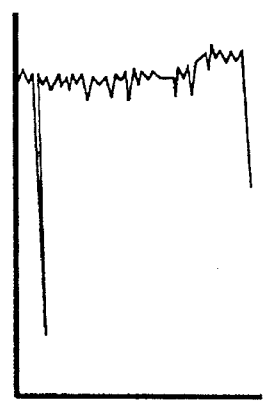

This pan of the description will follow the raw material flow which leads to the making of the adhesive compositions.

With reference to the unhydrogenated hydrocarbon resin, the feedstreams used in its manufacture are generally obtained from cracked petroleum feedstock and a subsequent refining processes. However feedstreams may also be obtained from other refining routes whilst having the same essential characteristics.

In the case of a feedstreams obtained by cracking, an early distillation step may yield a lighter fraction and a heavy fraction, the latter one of which in turn can be fractionated to give a heart cut distillate stream.

The components of the heart cut distillate stream boil in the region of from 140° C. to 220° C., preferably between 160° C. and 205° C.

Heart cut distillate (HCD) contains essentially at least 20 wt % of components contributing to aromaticity and preferably at least 15 wt % of vinyl toluenes anti at least 15 wt % of indenics (indene and methyl indenes). Advantageously it contains at least 50 wt % of polymerisable monomers. Suitably HCD contains less than 5 wt %, preferably less than 1 wt % of dicyclopentadiene or other diolefins. The other components may vary and can include non-aromatic polymerisables and/or non-polymerisables.

The above mentioned lighter fraction can be fractionated into a lighter olefin and diolefin stream and a heavier fraction which can be selectively hydrogenated to produce an olefin rich stream.

The lighter olefin and diolefin stream contains generally unsaturated hydrocarbons usually boiling in the range of 20° C. to 240° C., preferably 20° C. to 130° C. It is generally subjected to fractionation to remove C2 to C4 light ends. If the feedstock contains large amounts of cyclopentadiene it should preferably be subjected to thermal soaking at a temperature between 100° C. and 160° C., preferably 110° C. to 140° C. The thermal soaking preferably takes 0.5 hour to 6 hours, e.g. 0.5 to 3 hours to reduce the level of cyclopentadiene or dicyclopentadiene to below 2 wt %. Low temperature heat soaking is preferred in order to limit the cyclic diene (cyclopentadiene and methylcyclopentadiene) co-dimerisation with $C_5$ linear conjugated dienes (isoprene and pentadienes 1,3 cis- and trans-). After fractionation and, if carried out, thermal soaking, the feedstock is preferably subjected to distillation to remove cyclic conjugated diolefins which are gel precursors (cyclopentadiene and methylcyclopentadiene being removed as dimers). The piperylene stream or piperylene concentrate stream results which essentially contains at least 40 wt % of piperylene, with preferably a negligible aromatic content. The stream may contain however limited amounts of a branched chain olefin(s) which have a transfer activity. Suitably the piperylene concentrate stream contains at least 90 wt % of copolymerisable monomers with at least 50 wt % of piperylene (1,3-pentadiene) not more than 40 wt % of other $C_5$ olefins, less than 2% of isoprene and less than 1% of cyclopentadiene—(this term also includes dicyclopentadiene and methyl substituted analogues of cyclopentadiene and pentadiene).

As to the heavier fraction, a selective hydrogenation of the $C_5/C_6$ olefinic/diolefinic material yields a mono-olefinic stream referred as the olefin or $C_5$ olefin stream. The olefin stream contains essentially 50–90 wt % of polymensable monomers: and a minimum of 10 wt %, preferably 15, and especially 19 wt % of a branched chain olefin(s) (such as 2-Me-butene 1,2) which have a transfer activity.

This stream contains preferably less than 2 wt % of diolefins. It does contain limited amounts of branched olefins which have a chain transfer activity.

Isoprene should preferably be less than 2 wt %, preferably less than 1 wt % in the overall feed resulting from the combination of the individual streams.

Whilst essential characteristics of the different streams have been set out above as well as preferred levels of monomer contents in such streams, the combined effect of these streams in minimising or eliminating the use of purified transfer agent depends on an adequate combined presence of branched chain olefins and aromatics. Typically the combined minimum of aromaticity contributing monomers in the HCD and the $C_5$ olefins should be 140 wt % or some other value to achieve the desired narrow molecular weight distribution.

The following Table summarises the information.

The A value represents a lower threshold of concentration of the polymerisable components in the $C_5$ olefin and HCD stream.

The exact composition depends on the nature of the petroleum feedstock which is subjected to steam cracking. These feeds may contain materials such as paraffins and aromatics which are not polymerised during the process of the invention. More particular, preferred ranges of components in the streams are set out in the Examples.

The feed of the combined streams is then polymerised using any suitable Friedel-Crafts catalyst system. Generally these may be based on $AlCl_3$. It may be used in an amount of from 0.25 to 3.0 wt %, preferably 0.5 to 1.5 wt % based on the weight of the mixture to be polymerised. The optimum concentration depends on the nature of the solvent which affects to solubility of the catalyst as well as on the stirring efficiency inside the polymerisation reactor.

Other Friedel Crafts catalysts like titanium tri- or tetrachloride, tin tetrachloride, boron trifluoride, boron trifluoride complexes with organic ethers, phenols or acids can also be used but they lead to rather low resin yields and large quantities of liquid oligomers of low value are obtained. Even though these oily oligomers can be upgraded to reactive plasticizer or liquid plasticizer, such catalysts are not recommended. Other possible catalysts can be acidic clays.

Usual polymerisation temperatures are between −20° C. and 100° C., preferably between 30° C. and 80° C. If lower temperatures are used, the resin colour is improved although there can be a reduction in yield.

After polymerisation, the residual catalyst may be removed by, for example, washing with aqueous solution of alkali, ammonia or sodium carbonate, or by the addition of an alcohol such as methanol and subsequent filtration.

The final resin may be stripped of unreacted hydrocarbons ("raffinate" rich in benzene and/or paraffins/unreactive olefins) and low molecular weight oligomers by stream stripping or vacuum distillation. The finished resin usually has a higher softening point.

With reference to the hydrogenation, the raw resin prepared as described above contain both aromatic and aliphatic unsaturation. The resin is hydrogenated according to the invention to remove color whilst deliberately reducing the aromatic unsaturation. The hydrogenation may be batch or continuous. Typical examples of catalysts include nickel, palladium, platinum and molybdenum sulphide Ni—W, Ni—Mo, Co-Mo catalyst with a preferred catalyst being a preactivated catalyst on a support such as alumina, kieselguhr, activated charcoal, silica, silica alumina and titania.

TABLE

| Monomers | $C_5$ diolefin | $C_5$ olefin | Aromaticity contributing | Total polymerisable |
| --- | --- | --- | --- | --- |
| Stream Piperylene concentrate | >50% <2% isoprene <1% cpd/dcpd | <40% | "0% | >90% |
| $C_5$ olefin | "0% | >58% of which >18% branched chain olefin | "0% | A |
| HCD | <1% cpd/dcpd | "1% | >58% | B |
| TOTAL in feed | >50% piperylene | >98% | >58% | |

A + B > 120%, preferably at least 140 wt %
All % are wt %
cpd = cyclopentadiene
dcpd = dicyclopentadiene The hydrogenation step may take place in a solution of the resin in a suitable hydrocarbon solvent. The solution is passed with an excess of hydrogen or hydrogen rich gas over a catalyst. The hydrogenation may also take place in a batch reactor using intensive agitation of a solution and slurried catalyst particles.

After hydrotreating, the mixture from the reactor may be flashed and further separated to recover the solvent and hydrogen for recycle and to recover the hydrogenated resin. The solution is flashed and/or distilled in an oxygen-free or minimum oxygen atmosphere to eliminate the solvent, and thereafter, may be steam distilled to eliminate the possible light oily polymers of low molecular weight, known in the trade by name of "fill", preferably taking care not to raise the temperature of the resin above 325° C. to avoid degrading the colour and other properties of the finished resin.

The polymeric resin can be flaked.

Hydrogenated low colour resins are thus obtained from low cost streams avoiding undue amounts of costly purified streams. The resins have a narrow molecular weight distribution, optimum aromaticity and desirable molecular weight and viscosity characteristics for tackification of styrenic block copolymers.

To prepare the adhesive composition the block polymer and tackifier are blended in suitable mixing equipment together with additives. The characteristics of the resin permit very homogeneous mixing and good compatibility particularly with higher aromatic content block copolymers.

The blockcopolymers may include hydrogenated SIS and SBS blockcopolymers as well as unhydrogenated. The copolymer may be linear, radial, tapered, multiblock and multi-arm types.

Diblock copolymer may be present either added separately or as by-products from original tri-block manufacture. The weight molecular weight Mw may vary from 50,000 to 200,000.

The invention will now be described by reference to the following examples.

EXAMPLES

A reactor feed was mixed from feedstreams and a paraffinic solvent in the proportions set out in Table 2. The mixture was then polymerised at 50° C. using 0.75 wt % AlCl$_3$ as catalyst. The conditions used were as follows:

The reaction mixture (as described in Table 2) was fed to a 2 liters glass reactor which was fitted with a mechanical stirrer a cooler and a catalyst injection device. 0.75 wt % of powdered AlCl$_3$ as catalyst based on the total weight of the feed was injected into the reactor which was then held at 50° C. for 90 minutes. An ammonia solution was added to stop the reaction after the desired reaction time. The resin was then obtained after steam-stripping at 250° C. under nitrogen atmosphere. The total yield was 40 wt % (it can range from 30 to 45 wt %). 12 wt % of fill was removed in steam-stripping.

The piperylene cut stream, the C$_5$ olefin steamcracker stream and the heart cut distillate stream were obtained as explained previously and have the compositions set out in Table 1.

The three streams were combined into a single feed streams in the proportions set out in Table 2:

TABLE 1

| Monomers (wt %) | Piperylene Concentrate | Steamcracker C$_4$–C$_6$ Olefins | HCD |
|---|---|---|---|
| C$_4$ Olefins | | 2–7 | |
| Pentene-1,2 | 6–9 | 20–35 | |
| 2-Me-Butene-½ | 6–9 | 19–25 | |
| Cyclopentene | 14–16 | 6–18 | |
| C6 Olefins | | 1–9 | |
| Piperylene | 57–62 | <1 | |
| Isoprene | <2 | <1 | |
| CPD/DCPD | <2 | <3 | <1 |
| Styrene | | | 1–2 |
| %-Me-Styrene | | | 5 |
| c,t-β-Me-Styrene | | | 6 |
| Vinyl-Toluenes | | | 21–27 |
| Indene | | | 22–28 |
| Me-indenes | | | 0.5–2 |
| TOTAL Olefins | 28–34 | 58–82 | — |
| TOTAL Diolefins | 60–64 | <4 | <1 |
| TOTAL Aromatics | — | — | 58–67 |
| TOTAL Branched chain olefins | 6–9 | 19–25 | — |

Me = methyl
SC = steam cracker
CPD = cyclopentadiene
DCPD = dicyclopentadiene
c,t = cis, trans
HCD = heart cut distillate The table gives ranges reflecting common feedstream variations.

TABLE 2

| Name | Type | Characteristics | WT % |
|---|---|---|---|
| Cut Piperylene | C$_5$ Diolefin (D) C$_5$ Olefins (O) | D + O = 90–95 wt % D/O = 1.8–2.2 | 15 |
| C$_5$ Olefins (ex SC) | C$_4$–C$_6$ Olefins | 58–82 wt % content of olefins | 40 (36–50) |
| HCD | C$_8$–C$_{10}$ Aromatics | 58–67 wt % of total C$_8$–C$_{10}$ Indenics/Styrenics* = 0.7–0.9 | 35 (32–39) |
| LVN (Light Virgin Naphtha) | C$_5$–C$_7$ Paraffins | | balance (0–18) (0–18) |

*Indenics/styrenics = $\dfrac{\text{wt \% + Me-Indene}}{\text{Styrenics + Vinyl Toluenes}}$ The LVN is a polymerization diluent. The bracketed matter shows ranges available.

The resulting combined feed stream for the Example had the composition set out in Table 3:

TABLE 3

| Monomers (wt %) | |
| --- | --- |
| C$_4$ Olefins | 1 |
| Pentene-1,2 | 11.3 |
| 2-Me-Butene-½ | 10.6 |
| Cyclopentene | 7.5 |
| C$_6$ Olefins | 3.5 |
| Piperylene | 9.5 |
| Isoprene | 0.2 |
| CPD/DCPD | 0.3 |
| Styrenics: | 4.6 |
| Styrene | 0.5 |
| %-Me-Styrene | 1.9 |
| C,t-β-Me-Styrene | 2.2 |
| Vinyl-Toluenes | 8.2 |
| Indenics: | 10.2 |
| Indene | 9.6 |
| Me-Indenes | 0.6 |
| TOTAL Olefins | 34.3 |
| TOTAL Diolefins | 10 |
| TOTAL Aromatics | 22.5 |
| TOTAL Branched olefins | 10.6 |
| D + O | 44 |
| D/O | 0.29 |
| % Aromatics | 22.5 |
| TOTAL POLYMERIZABLE | 66.8 |

The resulting unhydrogenated raw resin had the following characteristics in Table 4:

TABLE 4

| NEAT UNHYDROGENATED PROPERTIES | |
| --- | --- |
| Softening point (°C.) | 85 |
| Initial colour (Gardner, HL) | 7 |
| Colour stability (Gardner) 5 hrs/175° C. | 15 |
| Aromaticity (wt % styrene) | 33 |
| Mn | 676 |
| Mw | 1160 |
| Mz | 1770 |
| Mw/Mn | 1.7 |

The resin was hydrogenated as follows:

The resins prepared as described above contain both aromatic and aliphatic unsaturation and may be hydrogenated by any suitable technique which removes the aliphatic unsaturation and leads to the required degree of hydrogenation of the aromaticity in the resin.

Before carrying out hydrogenation through a batch process the resin is preferably dissolved in a saturated hydrocarbon solvent typical batch hydrogenation takes place at a temperature of 100° C. to 200° C. at a pressure of 10 to 100 bar for a period of 1 to 4 hours. Typical catalysts are nickel palladium, platinum deposited on an inert support line alumina or silica.

Suitable proportions of catalysts are from 0.5 to 10% in relation to the resin.

By adjusting the above parameters, the batch time which is related to the hydrogen consumption and the final color of the resin can be reduced to the desired level, whilst at the same time the desired aromaticity content in the resin can be reached.

After filtering off the catalyst, the solvent is removed by distillation and recovered for recycling.

H2 consumption=150 Nl/kg (the hydrogen consumption expressed in liters; this corresponds to a number to moles by kg of resin)

T (temperature)=190° C.

P (pressure)=65 bar

D ( duration )=110 rain duration of batch treatment

Catalyst concentration=2.5 wt %

Solution concentration=30 wt %

The hydrogenated resin

The resulting polymerized hydrogenated resin according to the invention had a composition as set out in Table 5 as calculated from the feed composition and conversion ratios for the participating monomers.

TABLE 5

| 50% of the structure is aliphatic (linear/branched) |
| --- |
| 20% cyclic aliphatics |
| 30% aromatic |
| (wt %) |

The hydrogenated resin had the properties set out in Table 6:

TABLE 6

| NEAT HYDROGENATED RESIN PROPERTIES | |
| --- | --- |
| Softening point, R & B, °C. | 87 |
| Initial Colour, Saybolt | 26 |
| Colour Stability (Gardner) 5 hrs/175° C. | 7.5 |
| Mn | 730 |
| Mw | 1020 |
| Mz | 1525 |
| Mw/Mn | 1.4 |
| Viscosity, mPa · s. at 120° C. | 1110 |
| 150° C. | 200 |
| 160° C. | 140 |
| Aromaticity (wt % styrene) | 23 |
| Cloud point, °C. | |
| Melting point of EVA UL 15028/ECR-385/Microwax 86° C. 30/45/25 | <85 |
| Melting point of EVA UL 0453/ECT-385 50/50 | <70 |
| ACID number, mg KOH/gr MAX | 1 |
| Volatiles, 5 gr/5 hrs/175° C., wt % | 2.3 |
| Flash point (°C.) | <200 |

The melt-viscosity versus shear rate is set out in FIG. 1.

Table 7 shows comparatively the composition of a resin according to the invention against one obtained according to Maruzen U.S. Pat. No. 4,952,639.

TABLE 7

| Average Feed Blend Compositions | | |
| --- | --- | --- |
| (WT %) | MARUZEN | Invention |
| C$_5$ Diolefins | 25–75 | 10 |
| C$_5$ Olefins | 10–45 | 25–46 |
| D/O Ratio | 1–4 | 0.3–0.4 |
| Aromatics | 10–50 | 18–26 |

Next the hydrogenated resin was blended with blockcopolymer.

Table 8 shows the block copolymers used: Stereon and Vector are Registered Trade Marks.

TABLE 8

| Commercial Name | Vector 4461 D | Vector 4411 D | Stereon 840 A | K X 139 S | Vector 4211 D | Vector 4261 D |
|---|---|---|---|---|---|---|
| Nature | SBS | SIS | SBS | SBS | SIS | SBS |
| Composition | Triblock | Triblock | Multiblock | Tri/Diblock | Triblock | Triblock |
| Diblock wt % | 0 | 0 | not available | 16 | 0 | 0 |
| type | linear | linear | tapered and radial | linear | linear | linear |
| Typical styrene content, wt % (by NMR) | 43 | 44 | 42 | 40 | 29 | 29 |
| Melt flow rate gr/10 min. (ASTM D 1238) | 23 | 40 | 13 | 20 | 13 | 12 |
| Hardness Shore A (ASTM D 2240) | 87 | 87 | 80 | 84 | 60 | 65 |

Blending may be by a Z-blade mixer such as a Winkworth-type at 140° C. (usefully in the range of from 120° to 155° C.) from 60 minutes to 3 hours under a nitrogen atmosphere to reduce degradation.

Table 9 sets out the blend-ratio's for the different hot melt adhesive compositions prepared:

TABLE 9

| | In the Examples (typical) wt % |
|---|---|
| Block Copolymer | 22 |
| Resin | 60 |
| Oil (paraffinic typically) | 18 |
| Antioxidant/such as phenolic type, Irganox, a (Registered Trade Mark) 1010 from Ciba-Geigy | 0.2–1 |

Six blends were prepared of varying block copolymer type and using different resins The performance can be evaluated by reference to FIGS. 2 to 6.

TABLE 10

| | Not according to invention |
|---|---|
| Blend 1 | $C_5/C_9$/Terpene resin/V 4461 D (Triblock SSS (linear)) The resin is made according to EP 132291 |
| Blend 2 | $C_5/C_9$/Terpene resin/Stereon 840 (Multiblock tapered SBS (radial)) |
| Blend 3 | $C_5/C_9$/Terpene resin/KX 139 S(Tri/diblock SSS ((linear)) |
| Blend 4 | Terpene-aromatic resin/Resin L (Zonatac Lite)/ Stereon 840 A (multiblock tapered SBS(radial)) |
| | According to invention |
| Blend 5 | Resin of Example/V 4461 D (triblock SBS (linear)) |
| Blend 6 | Resin of Example/V 4411 D (Triblock SIS (linear)) |

In the Examples the softening point was determined by ring and ball (ASTM E-28). The GPC related data in the description and claims on Mn, Mw, Mz and Mw/Mn were calculated after measurements according to the following description. The calibration is set out in FIG. 1.

GEL PERMEATION CHROMATOGRAPHY METHOD USED

Resins are run on a GPC 201 Waters instrument equipped with four ultrastyragel columns. These columns are filled with a porous gel having pore sizes ranging from $10^4$ down to 100 Angstroms and a resolving power higher than that of microctyragel.

The set of ultrastyragel columns was calibrated with polystyrene standards to obtain the "universal" calibration. With each sample a reference (sulfur)is injected to take into account the small variations of flow-rate of the pump. Elution time of sulfur is always assumed to be 100 and the calibration is expressed in terms of reduced elution time $\theta=100$ t/ts where t is the elution time of species M and ts the elution time of sulfur.

For polystyrene following calibration equation was obtained:

$$\text{Ln } M = 53.4459 - 1.79226\theta + 0.0254066\theta^2 - 0.133993E - 3\theta^3$$

From this relationship, the "universal" calibration equation is deduced:

$$\begin{aligned} \text{Ln } M(n) &= -8.8457 + 1.713 \text{ Ln } M \\ &= 82.7071 - 3.07014\theta + 0.0435215\theta^2 - 229529E - 3\theta^3 \end{aligned}$$

$$\theta = \text{theta}$$

The calibration for the resins described in this patent was established by using 15 reference samples characterized by their number average molecular weight and intrinsic viscosity.

Following calibration equation was thus obtained:

$$\text{Ln } M = 62.6837 - 2.24478\theta + 0.0323598\theta^2 - 0.166704E - 3\theta^3$$

Determination of the aromaticity in the reins

A solution is made up of a known quantity of the resin (approximately 100 mg) and of a known quantity of internal standard in carbontetrachloride. Of this solution 0.5 ml is taken, deuteroform is added and the quantitative $^1$H-NMR-spectrum is run.

The integration of the aromatic region (between 8 and 6,4 ppm) is then compared with the integration of the internal standard.

Based on the number of protons involved in the different areas for the aromatic area:

styrene:5 alpha-methylstyrene:5 bisubstituted aromatics:4

The weights of the compounds, and the molecular weights of the monomer-units and the internal standard, the weight percentage of aromatic functional groups can be determined.

Advantages

High cohesive strengths with SBS and SIS block colopymers can be achieved.

Good performance hot melt pressure sensitive adhesive systems can be obtained using the low viscosity, good heat resistance, thermal stability, absence of skinning and good adhesion on olefinic polymer substances. The homogeneity obtainable is demonstrated by the absence of jerkiness in FIG. 2 for the blends of the invention. The resin can provide good creep resistance particularly where the block copolymer contains less than 5 wt % of a diblock.

We claim:

1. An adhesive composition comprising 12 to 35 wt. % of an SBS or SIS block copolymer and 65 to 30 wt. % of a low-colour hydrocarbon resin of a softening point of from 75° to 110° C. and a Mw/Mn as determined by GPC of less than 2, said low-colour hydrocarbon resin prepared by:
   (1) preparing a resin from a feed containing a piperylene stream and an olefinic cracker stream to provide a diolefin/olefin ratio (D/O) of from 1/10 to 1/1 and a heart cut distillate stream containing $C_8$ to $C_{10}$ aromatics to provide at least 5 wt. % of indenic feed material using Friedel-Crafts catalyst to provide a resin having an aromaticity of at least 25%; and
   (2) hydrogenating the resin to an extent whereby less than 80% of the aromatic structures are hydrogenated so as to provide an aromaticity of from 15 to 25% equivalent wt. % styrene as determined by the number of aromatic protons using proton NMR.

2. The adhesive composition according to claim 1 in which the feed contains from 50 to 30 wt. % of the piperylene stream; from 30 to 60 wt. % of the olefin cracker stream and from 65 to 10 wt. % of the heart cut distillate; and 0 to 15 wt. % of a separate branched chain olefin stream said wt. % being calculated on the total weight of feedstream excluding an inert solvent.

3. The adhesive composition according to claim 2, wherein said branched chain olefin is 10 wt. %.

4. The adhesive composition according to claim 1, in which the hydrogenation is at 180° to 200° C. in continuous or batch form.

5. The adhesive composition according to claim 2, in which the hydrogenation is at 180° to 200° C. in continuous or batch form.

6. The adhesive composition according to claim 1, in which the hydrogenated resin has a melt viscosity at a shear rate of 50 $sec^{-1}$ of less than 500 mPa.s at 160° C.

7. The adhesive composition according to claim 2, in which the hydrogenated resin has a melt viscosity at a shear rate of 50 $sec^{-1}$ of less than 500 mPa.s at 160° C.

8. The adhesive composition according to claim 3, in which the hydrogenated resin has a melt viscosity at a shear rate of 50 $sec^{-1}$ of less than 500 mPa.s at 160° C.

9. The adhesive composition according to claim 1, in which the block copolymer has a styrene content of from 20 to 60 wt. %.

10. The adhesive composition according to claim 9, in which the block copolymer has a styrene content of from 25 to 50 wt. %.

11. The adhesive composition according to claim 1, in which the block copolymer contains no more than 5 wt. % of a diblock copolymer.

12. The adhesive composition according to claim 1, wherein said resin has an aromaticity of at least 50 wt. % prior to hydrogenation.

13. The adhesive composition according to claim 1, in which the hydrogenated resin has a melt viscosity at a shear rate of 50 $sec^{-1}$ of less than 300 in mPa.s at 160° C.

14. The adhesive composition according to claim 2, in which the hydrogenated resin has a melt viscosity at a shear rate of 50 $sec^{-1}$ of less than 300 in mPa.s at 160° C.

15. The adhesive composition according to claim 3, in which the hydrogenated resin has a melt viscosity at a shear rate of 50 $sec^{-1}$ of less than 300 in mPa.s at 160° C.

* * * * *